United States Patent
Bintz et al.

(10) Patent No.: US 8,540,483 B2
(45) Date of Patent: Sep. 24, 2013

(54) TURBINE ENGINE ROTATING CAVITY ANTI-VORTEX CASCADE

(75) Inventors: Matthew E. Bintz, West Hartford, CT (US); Peter T. Schutte, Manchester, CT (US); Anthony R. Bifulco, Ellington, CT (US); Eric W. Malmborg, Amston, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/416,414

(22) Filed: Mar. 9, 2012

(65) Prior Publication Data

US 2012/0171029 A1    Jul. 5, 2012

Related U.S. Application Data

(62) Division of application No. 12/425,552, filed on Apr. 17, 2009, now Pat. No. 8,177,503.

(51) Int. Cl.
*F01D 9/00* (2006.01)
(52) U.S. Cl.
USPC .................. 415/208.2; 415/208.4; 415/209.3; 415/211.2
(58) Field of Classification Search
USPC ....................... 415/208.1, 208.4, 209.3, 211.2
See application file for complete search history.

(56) References Cited

U.S. PATENT DOCUMENTS

| 4,576,547 | A | 3/1986 | Weiner et al. |
| 4,645,416 | A | 2/1987 | Weiner |
| 4,815,272 | A | 3/1989 | Laurello |
| 5,350,278 | A | 9/1994 | Burge |
| 5,351,732 | A | 10/1994 | Mills et al. |
| 5,472,313 | A | 12/1995 | Quinones et al. |
| 6,939,102 | B2 | 9/2005 | Liang |
| 7,086,830 | B2 | 8/2006 | Fitzgerald et al. |
| 7,309,210 | B2 | 12/2007 | Suciu et al. |
| 7,448,221 | B2 | 11/2008 | Suciu et al. |
| 2010/0209238 | A1* | 8/2010 | Praisner et al. ............ 415/208.2 |

* cited by examiner

*Primary Examiner* — Matthew W Such
*Assistant Examiner* — David Spalla
(74) *Attorney, Agent, or Firm* — Carlson, Gaskey & Olds, P.C.

(57) ABSTRACT

A gas turbine engine rotor drum includes spaced apart discs providing a cavity between the discs. The discs are configured to rotate in a rotational direction about an axis. An annular support is mounted on at least one of the discs and within the cavity. A cascade of relatively short anti-vortex members is mounted circumferentially on the annular support. The anti-vortex members include an outer end having a concave surface extending within the cavity radially outward from the annular support. The concave surface faces the rotational direction and promotes swirl as the rotor drum rotates.

4 Claims, 2 Drawing Sheets

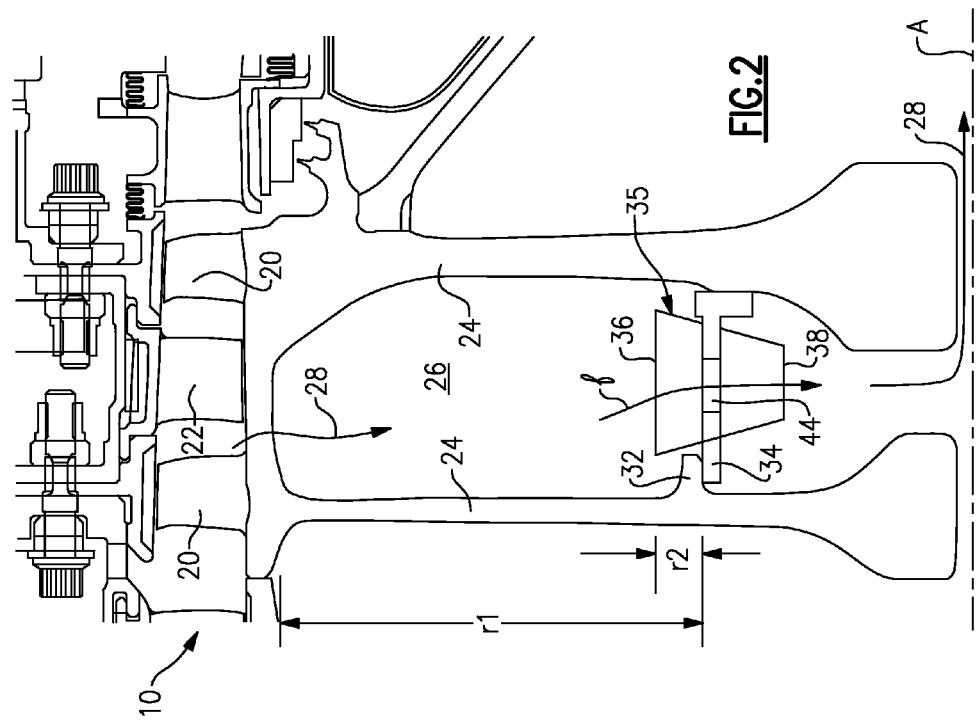
FIG.2
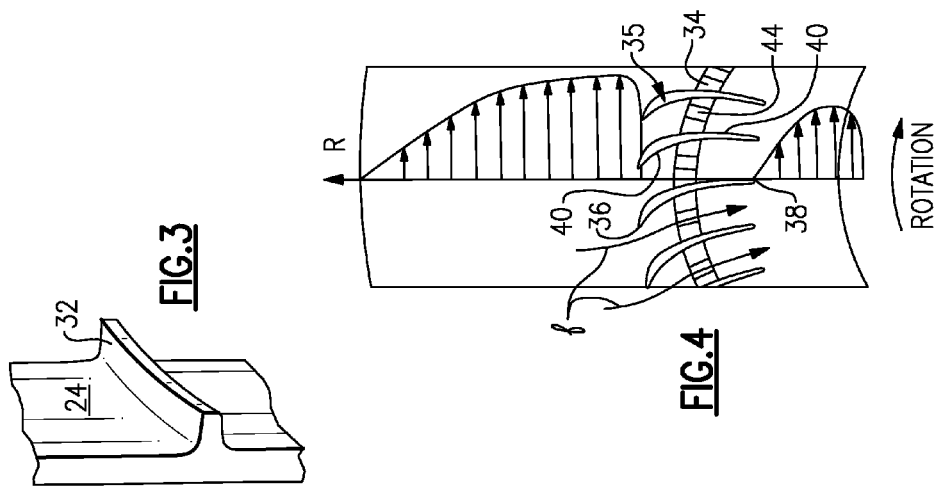
FIG.3
FIG.4

TURBINE ENGINE ROTATING CAVITY ANTI-VORTEX CASCADE

This application is a divisional application of U.S. Ser. No. 12/425,552, which was filed on Apr. 17, 2009 now U.S. Pat. No. 8,177,503.

BACKGROUND

This disclosure relates to a gas turbine engine that includes anti-vortex features. In particular, the anti-vortex features are arranged within a cavity between discs in a compressor section, for example.

A gas turbine engine includes components for channeling air flow through the gas turbine engine along a desired flow path. Conditioning air along the flow path extracts heat from portions of the gas turbine engine to maintain desired operating temperatures. For example, thermal gradients and clearances are controlled in a compressor section of the gas turbine engine to ensure reliable performance and efficiency within the compressor section.

Typically, anti-vortex tubes have been used to provide a radial inflow of conditioning air through a compressor rotor drum between rotor discs. The anti-vortex tubes are arranged within a cavity that is provided axially between a pair or rotor discs. The anti-vortex tubes are circumferentially spaced from one another and are used to prevent vortices within the cavity that would reduce the radial inflow of conditioning air. The tubes often extend the full height of the cavity to suppress the vortexing of conditioning air, which reduces the pressure drop across the cavity making it easier to achieve desired radial inflow of conditioning air. However, the long anti-vortex tubes can also inhibit heat transfer from the discs by suppressing the natural tendency of the air to generate a swirl as it moves radially inwardly. The swirl of air within the cavity increases convection heat exchange of the rotor discs. The typically long anti-vortex tubes reduce the relative velocity of the conditioning air on the disc, thus reducing the heat transfer coefficient. Moreover, some or all of the air flow passes through the tubes to further reduce the heat transfer by reducing the mass flow of conditioning air the discs are exposed to.

A heat exchange arrangement is needed in the compressor rotor drum that provides the desired inflow of conditioning air while achieving sufficient heat transfer on the discs with minimal pressure drop for downstream applications of conditioning air. High heat transfer on the discs is desirable to augment bore and web thermal response for managing disc thermal gradient and life of critical rotating parts. Additionally high heat transfer rates improve time constant of the discs for improved clearance control between rotating and static structure where blade tip and stator tip clearances are critical for performance and operability.

SUMMARY

A gas turbine engine rotor drum includes spaced apart discs providing a cavity between the discs. The discs are configured to rotate in a rotational direction about an axis. An annular support is mounted on at least one of the discs and within the cavity. A cascade of relatively short anti-vortex members is mounted circumferentially on the annular support. The anti-vortex members include an outer end having a concave surface extending within the cavity radially outward from the annular support. The concave surface faces opposite the rotational direction and serves as a scoop to capture velocity head from highly swirled flow minimizing pressure loss.

Accordingly, the disclosed cascade of anti-vortex members provides a heat exchange arrangement in the compressor rotor drum that promotes the desired inflow of conditioning air while achieving sufficient heat transfer of the discs and minimizing pressure loss.

BRIEF DESCRIPTION OF THE DRAWINGS

The disclosure can be further understood by reference to the following detailed description when considered in connection with the accompanying drawings wherein:

FIG. 2 is an enlarged cross-sectional view of a portion of the compressor section show in FIG. 1 with an example anti-vortex member.

FIG. 3 is an enlarged, broken perspective view of a portion of a disc rotor.

FIG. 4 is a schematic, cross-sectional view of a partial cascade of anti-vortex members like the anti-vortex member illustrated in FIG. 2.

DETAILED DESCRIPTION

Figure 1:
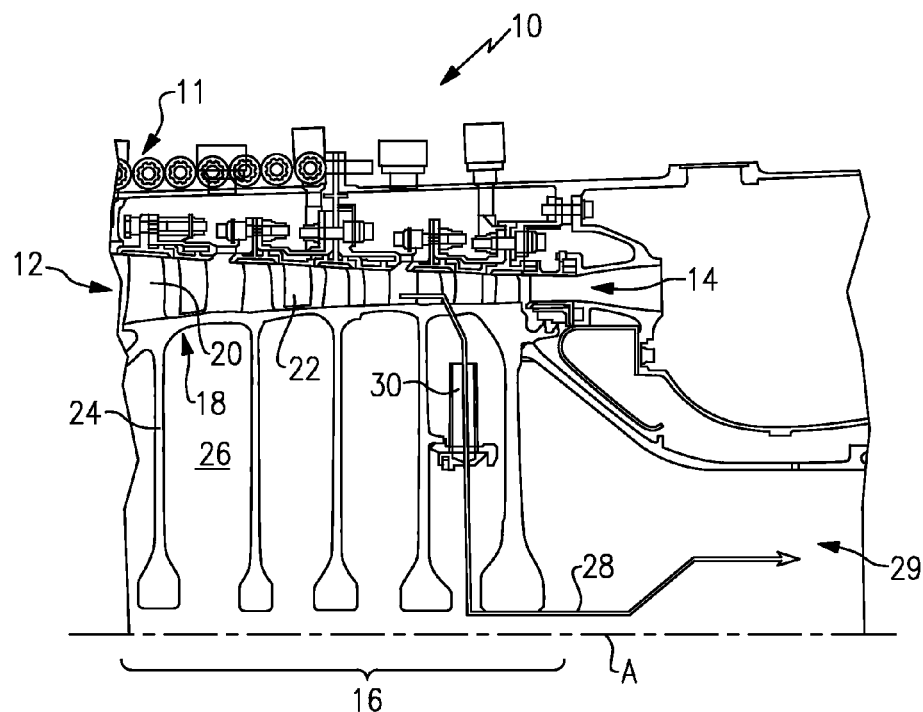
FIG. 1 is a cross-sectional view of a portion of a gas turbine engine compressor section.

A schematic view of a compressor section 16 of a gas turbine engine 10 is shown in FIG. 1. The compressor section 16 is arranged in a core 11 and includes an inlet 12 and an outlet 14. A rotor drum 18 of the compressor section 16 includes multiple discs 24 supporting arrays of circumferentially arranged blades 20 arranged in an axially constricting passage. Stator vanes 22 are arranged between the blades 20.

A cavity 26 is provided between the discs 24. A flow path 20 provides a radial inflow of conditioning air from one of the compressor sections into the cavity 26. The conditioning air is used to transfer heat to and from the discs 24 and to control clearances within the compressor section 16. In the example, the conditioning air is directed radially inward toward the rotational axis A of the compressor section 16 before exiting axially rearward 29 for heat exchange of other components.

An example prior art anti-vortex tube 30 is illustrated in FIG. 1. Multiple anti-vortex tubes 30 are arranged circumferentially about the axis A to prevent undesired vortices within the cavity 26 that reduce conditioning air pressure at the bores of discs 24. Vortices increase the pressure drop within the cavity 26, which inhibits the flow of conditioning air through the cavity. However, as can be appreciated from FIG. 1, the anti-vortex tubes 30 extend a significant radial length within the cavity 26, which can reduce the heat transfer to and from the discs 24 to the conditioning air by reducing the swirl velocity and the mass flow rate of fluid within the cavity 26 as well as reducing convection heat exchange. While vortices are undesirable for pressure loss, it is desirable to obtain a swirl of conditioning air within the cavity 26 to increase convection on the discs 24. Long anti-vortex tubes prevent swirl and reduce the amount of conditioning air exposed to the discs comprising cavity 26.

One example anti-vortex cascade is illustrated in FIGS. 2 and 4. The example anti-vortex cascade promotes vortexing of air in the cavity by recapturing high velocity flow thus minimizing pressure loss over a shorter radial extent. An annular support 34 is secured to an annular ledge 32, best shown in FIG. 3, in a conventional manner. Multiple circumferentially arranged anti-vortex members 35, which rotate with the discs 24, are mounted on the annular support 34 similar to the paddles on paddle wheel of a boat. As best shown in FIG. 4, the anti-vortex members 35 are shaped like an airfoil. The anti-vortex members 35 have a concave surface 40 extending radially from the axis A and facing opposite the direction of rotation. A convex surface 42 is arranged opposite the concave surface 40. Apertures 44 are arranged in the annular support 34 between the anti-vortex members 34 to permit the radial inflow of conditioning air F from the cavity 26 radially inward toward the axis A.

Returning to FIG. 2, the anti-vortex members 35 include an outer end 36 disposed within the cavity 26 and an inner end 38 opposite the outer end 36 on the other side of the annular support 34. The cavity 26 extends a radial length R1. The anti-vortex member 35 extends from the annular support 34 radially outward into the cavity 26 a radial length R2, which is significantly less than the radial length of prior art anti-vortex tubes (see, for example, FIG. 1).

Figure 5:
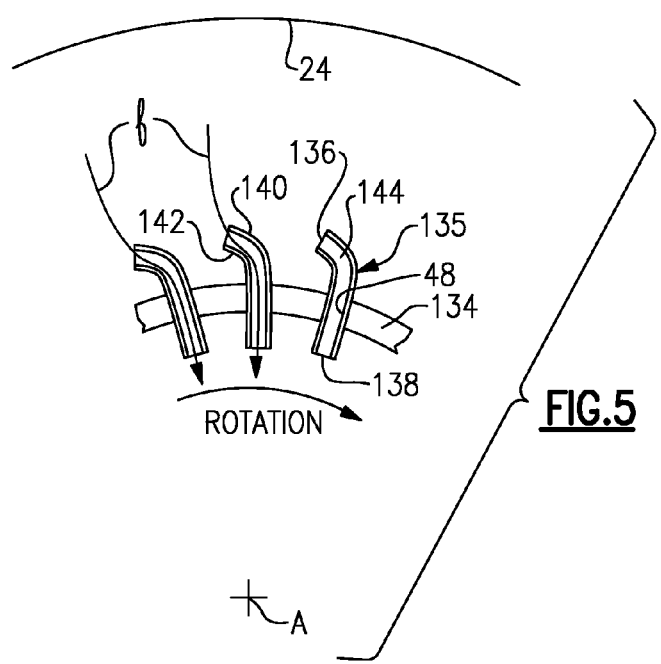
FIG. 5 is a schematic, cross-sectional view of another example partial cascade of anti-vortex members.

Another example anti-vortex cascade, shown in FIG. 5, uses curved tubes to function as scoops. The annular support 134 includes circumferentially spaced anti-vortex members 135 arranged within circumferentially spaced openings 48 in the annular support 134. The anti-vortex members 135 extend from an outer end 136 disposed within the cavity 26 to an inner end 138 on the other side of the annular support 134. In one example, the anti-vortex members 135 have a generally circular cross-section. Apertures 144 extend from the outer end 136 to the inner end 138 to permit the passage of conditioning air F radially inward from the cavity 26 toward the axis A. The outer end 136 faces opposite the direction of rotation, and the tube curvature 135 turns the flow inward toward axis A exiting through aperture 138. The outer ends 136 extend into the cavity 26 a radial length R2, which is significantly less than the radial length of prior art anti-vortex tubes (see, for example, FIG. 1).

Although example embodiments have been disclosed, a worker of ordinary skill in this art would recognize that certain modifications would come within the scope of the claims. For that reason, the following claims should be studied to determine their true scope and content.

What is claimed is:

1. An anti-vortex cascade for a gas turbine engine comprising:
   an annular support arranged about a rotational axis and including a rotational direction in which the annular support is configured to rotate;
   multiple anti-vortex members mounted circumferentially on the annular support, the anti-vortex members including an outer end having a concave surface extending from the axis radially outward from the annular support; and
   wherein the annular support includes an aperture arranged between the anti-vortex members configured to permit conditioning air radially inward through the annular support.

2. The anti-vortex cascade according to claim 1, wherein the concave surface faces opposite the rotational direction.

3. The anti-vortex cascade according to claim 2, wherein the anti-vortex members are airfoil-shaped and oriented generally radially relative to the rotational axis.

4. The anti-vortex cascade according to claim 2, wherein anti-vortex members are bent or curved tubes supported in circumferentially spaced openings in the annular support.

* * * * *